United States Patent [19]

Smilanich et al.

[11] 4,256,815
[45] Mar. 17, 1981

[54] SEALS FOR ELECTROCHEMICAL CELLS

[75] Inventors: Nicholas J. Smilanich, Rocky River; Samuel F. Reichert, Brunswick, both of Ohio

[73] Assignee: Union Carbide Corporation, New York, N.Y.

[21] Appl. No.: 114,078

[22] Filed: Jan. 21, 1980

[51] Int. Cl.³ ............................................. H01M 2/08
[52] U.S. Cl. ................................. 429/185; 429/171; 429/174
[58] Field of Search ......................... 429/185, 171-174

[56] References Cited

U.S. PATENT DOCUMENTS 3,708,343  1/1973  Walsh ............................. 429/185 X
3,922,178  11/1975  Winger ............................... 136/133
4,128,705  12/1978  Winsel ............................ 429/185 X

FOREIGN PATENT DOCUMENTS 54-23936  2/1979  Japan .
54-23937  2/1979  Japan .
54-50832  4/1979  Japan .

Primary Examiner—Charles F LeFevour
Attorney, Agent, or Firm—Cornelius F. O'Brien

[57] ABSTRACT

A sealed electrochemical cell having a secondary seal comprising a bead of a polyamide adhesive disposed on the top of the cell's gasket and extending into the cover-gasket and the container-gasket interfaces, thereby filling any crevices at those interfaces.

6 Claims, 2 Drawing Figures

SEALS FOR ELECTROCHEMICAL CELLS

FIELD OF THE INVENTION

The invention relates to the sealing of electrochemical cells and specifically to the sealing of the interface between the container and cover of the cell using a gasket having at least a portion of its surface coated with a polyamide material (primary sealant) and wherein a bead of a polyamide adhesive (secondary sealant) is disposed on the top edge (external) of the gasket and extends over to contact and at least partially cover the edge of the container and the peripheral edge of the cover, thereby filling any crevices at the cover-gasket interface and the container-gasket interface.

BACKGROUND OF THE INVENTION

The ability of alkaline electrolytes to wet a metal surface is one of the major causes of leakage in alkaline galvanic cells. The alkaline electrolyte, by wetting the surface of the metal, can actually "creep" through a sealed metal interface. For this reason, elaborate precautions have been made to prevent the electrolyte in an alkaline cell from contacting the interface between a seal and certain metal parts of a seal, such as the metal container and the metal cover of the cell. Typical cell systems where this problem is encountered include silver oxide-zinc cells, nickel-cadmium cells, air-depolarized cells and alkaline manganese dioxide cells. In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be sufficiently flexible and resistant to cold flow under pressure of the seal and maintain these characteristics so as to insure a proper seal during long periods of storage. Material, such as nylon, polypropylene, ethylene-tetra-fluroethylene copolymer (Tefzel) and high density polyethylene have been found to be suitable as gasket materials for most applications.

However, due to the propensity of alkaline electrolytes, such as aqueous potassium hydroxide and sodium hydroxide solutions, to wet metal surfaces, the use of gaskets, such as nylon, have not completely solved the leakage problem. Unfortunately, electrolyte leakage not only depletes the electrolyte solution from the cell but can also cause a corrosive deposit at the cover-container interface that not only affects the cell's appearance but could also cause damage to the device in which the cell is used. In addition, if leakage occurs while the cell is being transported and stored at a retailer's establishment, then the cell becomes unmarketable, resulting in a total loss.

U.S. Pat. No. 3,922,178 discloses a sealing means for alkaline batteries which comprises the use of a polyamide, specifically a fatty polyamide, as a sealant or protective coating to prevent alkaline electrolyte from wetting surfaces within the cell.

U.S. Pat. No. 3,713,896 discloses an insulating seal for alkaline cells which consists of a layer of cured epoxy-polyamide resin located and compressed between a metallic container and a metallic cover.

It is an object of the present invention to provide an electrochemical cell with an improved sealing means to prevent electrolyte leakage from the cell.

It is another object of the present invention to provide a secondary seal for electrochemical cells which comprises a nonconductive gasket coated with a fatty polyamide (primary sealant) disposed and squeezed between the interface of the cover and container of the cell and wherein a bead of a polyamide adhesive (secondary sealant) is disposed on the top edge of the gasket and extends over to contact and at least partially cover the edge of the container and the peripheral edge of the cover and serves as a physical barrier against electrolyte creepage and/or leakage at the interfaces of the container-gasket and cover-gasket.

The invention also relates to a method of sealing electrochemical cells whereby a polyamide adhesive is disposed on the top of the gasket between the cover and the container of the cell and then the container is crimped or curled over the gasket and the cover whereupon the polyamide adhesive forms a barrier bead secured to the top edge of the gasket and extending over to contact the peripheral edge of the cover and the edge of the container.

The foregoing and additional objects will become more fully apparent with the following description.

SUMMARY OF THE INVENTION

The invention relates to a sealed electrochemical cell comprising a cathode material, an anodic material and an electrolyte housed in a container sealed at its open end by a closure means which comprises a cover and a non-conductive gasket having at least a portion of its surface coated with a polyamide-containing material (primary sealant), said coated gasket being disposed and compressed between the interface of the cover and the container; the improvement being a bead of a polyamide adhesive disposed on the top edge of the gasket and extending over to contact and at least partially cover the edge of the container and the edge of the cover and filling crevices at the cover-gasket and container-gasket interfaces, thus providing a physical barrier against leakage at those interfaces and against moisture and oxygen ingress.

The invention also relates to a method of assembling a sealed electrochemical cell comprising the steps:

(a) assembling in a container a cathodic material, an anodic material and an electrolyte;

(b) placing a closure means over the open end of the container, said closure means comprises a cover and a nonconductive gasket at least partially coated with a polyamide-containing material, said coated gasket disposed between the interface of the cover and the container;

(c) dispensing a polyamide adhesive onto the top edge of the gasket and extending to contact the peripheral edge of the cover and the top end wall of the container; and (d) curling the top edge of the container over the gasket and cover so as to provide a liquid tight seal in which the adhesive forms a bead disposed on the top edge of the gasket and extending over to contact and at least partially cover the top edge of the container and the peripheral edge of the cover.

As used herein a polyamide adhesive shall mean an adhesive made from a polymer, usually of a carboxylic acid (e.g., adipic acid) and its aminated derivative, in which the structural units are linked by amide or thioamide groupings in which many have fiber-forming properties. A preferred polyamide adhesive for use in this invention is a fatty polyamide having an amine number about 10 and as high as above 400. Amine number is defined as the milligrams of KOH equivalent to the amine alkalinity present in one gram of the polyamide. Suitable fatty polyamides can be obtained from General Mills, Inc., Minneapolis, Minn. and the Henkel Corporation as Versamid 115, 125 or 140 having amine numbers of 230–246, 330–360 or 370–400, respectively. The latter fatty polyamide is preferred because it has a relatively low viscosity (2.4–4.5 poise) which makes it mechanically easier to dispense during automated cell assembly and because of its greater reactivity (hence, better bonding) as indicated by its higher amine number. The polyamide adhesive may be mixed with extenders, modifiers and/or hardeners in order to modify the physical properties of the polyamide.

In the preferred embodiment of the invention, the gasket is coated with a fatty polyamide as disclosed in U.S. Pat. No. 3,922,178. Fatty polyamides are described on pages 597 to 615 in Volume 10 of the "Encyclopedia of Polymer Science and Technology", Interscience Publishers (John Wiley and Sons, Inc.), New York, Briefly, fatty polyamides are produced by reacting a polybasic acid with a polyfunctional amine. Generally the polybasic acids are principally dibasic acids formed by the dimerization of, for instance, a $C_{18}$ unsaturated fatty acid derived from an unsaturated vegetable oil. Such dimers are then reacted with a diamine, such as ethylenediamine, propylenediamine, and the like. Fatty polyamides are available commercially from, for example, General Mills, Inc., Minneapolis, Minn. and the Henkel Corporation under the tradename of "Versamid". The fatty polyamides can be employed in any physical shape or configuration that is appropriate for the particular protective application to be performed. For example, the fatty polyamide can be applied as a coating over the surface to be protected or the fatty polyamide can be employed as a seal or other configuration. U.S. Pat. No. 3,922,178 discloses the use of fatty polyamides and the disclosure so made is incorporated herein by reference.

Alternately, cured epoxy-polyamide resins as disclosed in U.S. Pat. No. 3,713,896 can be employed on the gasket and such disclosure is incorporated herein by reference. Specifically the mixtures of epoxy and polyamide suitable for use on gaskets could range from $5\frac{3}{4}$ parts by weight of polyamide to 1 part of epoxy to 1 part polyamide to 3 parts epoxy.

In order to improve the ability of the seal to contain caustic electrolytes, such as an aqueous potassium hydroxide solution or an aqueous sodium hydroxide solution, it is necessary to fill crevices at the cover-gasket and container-gasket interfaces thereby substantially eliminating any paths for electrolyte leakage. It has been observed that the standard type gaskets, such as nylon, which are highly compressed between the metal container and cover are fairly rigid materials and thus unable to conform exactly to the surface of the metal. In addition, with the use of fatty polyamides, epoxy resins, asphalt or cured-epoxy polyamides, an improvement is noted but it is believed that it does not completely fill all of the crevices between the interfaces of the cover-gasket and the container-gasket. It has been found, however, that a bead of a polyamide adhesive disposed on the top edge of the gasket and extending over to contact and at least partially cover the edge of the container and the edge of the cover will seal or fill crevices at the cover-gasket-container interfaces and, therefore, provide an effective adhesive barrier against electrolyte leakage at these interfaces. The amount of the polyamide adhesive to be used will depend on the size of the cell and for most button cells ranging in diameter between about 0.267 inch (6.78 mm) and about 0.906 inch (23.0 mm), the amount of polyamide adhesive employed could vary between about 2 milligrams and about 7 milligrams, respectively.

The preferred embodiment of this invention would comprise a sealing closure consisting of a nylon gasket having a coating of fatty polyamide of between about 0.1 mil and about 0.5 mil thick, preferably about 0.3 mil, and applied from a solution of about 50 grams of fatty polyamide per liter of a solvent, such as trichloroethylene. The coated gasket is radially squeezed (swaged) between the cover and the container and then viscous polyamide adhesive is dispensed around the top edge of the gasket and extending to contact the terminal edge of the cover and the top wall of the container. The application of conventional crimping techniques can then be employed to provide a liquid tight seal.

The insulating gasket disposed between the cover and the can has to be stable in the presence of the cell components and can be selected from such materials as polytetrafluroethylene, fluorinated ethylene-propylene, ethylene copolymer with fluorinated ethylene-propylene, chlorotrifluoroethylene, perfluoro-alkoxy polymer, polyvinyl, polyethylene, polypropylene, polystyrene, nylon, etc.

The present invention will become apparent from the following description thereof when considered together with the accompanying drawings which are set forth as being exemplary of embodiments of the present invention and are not intended, in any way, to be limitative thereof and wherein.

Figure 1:
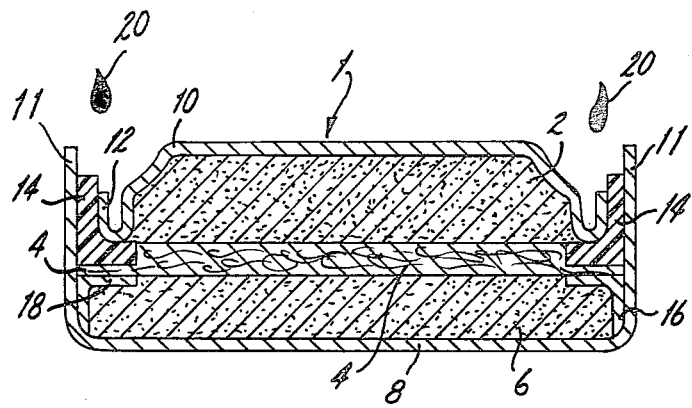
FIG. 1 is a sectional side elevation view taken through a partially assembled button cell just prior to dispensing a polyamide adhesive on top of the cell's gasket.

Referring to FIG. 1, there is shown a sectional elevation of a partially assembled button cell 1 having a negative electrode (anode) 2, separator 4, and positive electrode (cathode) 6 housed within a two-part housing comprising a cathode container 8 and anode cup 10. As shown, gasket 14 is disposed between the flange 11 of cathode container 8 and the U-shaped flange 12 of anode cup 10.

The separator 4 may be a polypropylene or a cellulosic member. An electrolyte is absorbed by the separator 4 and also a portion of it could be mixed in with the cathode mix forming the cathode of the cell. When using a cathode mix, an optional support ring 16 may be disposed in the cell adjacent the upstanding wall of the cathode container 8 and having an inwardly extended flange member 18 for supporting the separator 4. The support member is primarily employed to provide a rigid backup member as a support for cathode 6 and thus prevent cathode 6 from being compressed during the sealing of the cell. The gasket is radially squeezed between the cover and the container as disclosed in U.S. Pat. No. 3,069,489, thereby providing a primary barrier to leakage.

Figure 2:
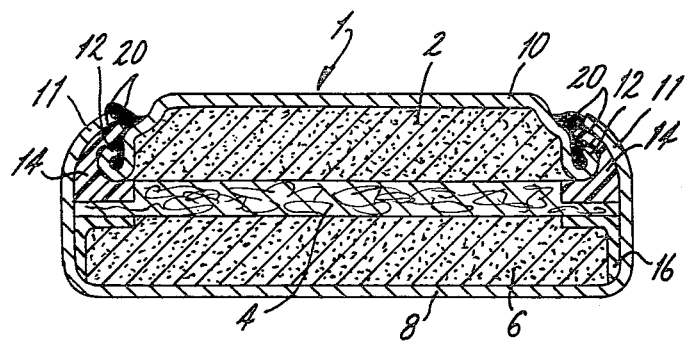
FIG. 2 is a sectional side elevation view taken through an assembled button cell showing a bead of polyamide adhesive disposed on top of the gasket between the cover and container of the cell.

Prior to crimping flange 11 inwardly towards U-shaped flange 12 of anode cup 10 via gasket 14, a polyamide adhesive 20 is dispensed around the top of gasket 14 and extends to contact flange 11 and flange 12 of the cell's housing. Thereafter, the flange 11 is crimped or curled inwardly, providing a secondary barrier to leakage. This produces an assembled cell as shown in FIG. 2 in which the polyamide adhesive 20 forms a bead disposed on the top edge of gasket 14 and extends over to contact the flange 11 of container 8 and flange 12 of anode cup 10, thereby filling any crevices at the container-gasket and cover-gasket interfaces. The common components of FIGS. 1 and 2 have been identified with the same reference numbers.

The secondary seal for button cells in accordance with this invention will provide effective liquid tight seals that will prolong the useful life of the cell and minimize damage to devices in which the cells are employed.

EXAMPLE

Ten lots of various sizes and amounts of button cells were produced as disclosed in the Table, each employing a zinc anode, an electrolyte of an aqueous KOH solution, a monovalent silver oxide-containing cathode and a dual separator consisting of a cellulosic barrier film and an electrolyte absorbent layer disposed between the anode and the cathode. Components were assembled in various size button cell housings which were sealed with a conductive cover via a sealing closure disposed and compressed between the interface of the container and the cover. Each cell employed a nylon gasket coated with a 0.3 ml thick fatty polyamide which was applied by a solvent mixture of 50 grams of a fatty polyamide to 1 liter of the solvent trichloroethylene. The fatty polyamide material employed was Swift's Z-610 obtained from the Swift Chemical Company. Cell Lot Nos. 1 and 6 were assembled and radially sealed according to U.S. Pat. No. 3,069,489 and formed the control cells for the test.

Before crimping the container inwardly against the cover for the remaining cells in Cell Lot Nos. 2 to 5 and 7 to 10, a polyamide adhesive was applied to the edge of the coated gasket in each cell as disclosed in FIG. 1 and then each cell was crimped to further seal the cell as shown in FIG. 2. In Cell Lot Nos. 2 and 7 the polyamide adhesive was a polyamide resin having an amine number of 230 to 246, a viscosity of 575 poise at 40° C. and was obtained commercially as Versamid 115 from General Mills, Inc.

In Cell Lot Nos. 3 and 8 the polyamide adhesive was a polyamide resin having an amine number of 330 to 360, a viscosity of 100 poise at 40° C. and obtained commercially at Versamid 125.

In Cell Lot Nos. 4 and 9 the polyamide adhesive was a polyamide resin having an amine number of 370 to 400, a viscosity of 40 poise at 40° C. and obtained commercially as Versamid 140.

In Cell Lot Nos. 5 and 10 the polyamide adhesive containing a fatty polyamide having an amine number of about 70, a viscosity of 18.8 poise at 150° C. and was obtained commercially as Swift's Z-610 from Swift Chemical Co., Adhesive Products Department, Chicago, Ill.

The polyamide adhesive in each cell lot was dissolved in trichloroethylene at a concentration of 100 grams per liter of solution of trichloroethylene and applied to the cell during assembly between the swage and crimp operations. The solvent was then removed by drying at room temperature and then the cells were crimped to further seal the cells.

Each of the cells in each lot was then stored for 12 months at room temperature and then each of the cells was examined to see if any leakage and/or salting appeared at the interface of the sealing means and the container and/or the interface of the cover and the sealing means. On visual observation it was noted whether there was light salting (L) as observed under 20X magnification, or heavy salting (H) as observed without magnification at the negative (interface of the sealing means and the cover) and the positive (interface of the container and the sealing means) terminals. By salting is meant a whitish residue as existing at the seal area of the cells. In addition, any liquid apparing at either the positive or negative terminal area was noted. The observations so made are presented in the Table and clearly show that the sealing means in accordance with this invention produces a marked improvement in providing a liquid tight seal for larger size alkaline cells.

It is to be understood that other modifications and changes to the preferred embodiment of the invention herein shown and described can also be made without departing from the spirit and scope of the invention.

TABLE

| Cell Lot No. | OBSERVED LEAKAGE AND/OR SALTING | | |
|---|---|---|---|
| | Positive Terminal | Negative Terminal | ***% Total |
| *1 | 1L | 1H | 13% |
| | 1H | 4W | |
| *2 | 1H | 1H | 13% |
| | | 5W | |
| *3 | 1H | 1H | 10% |
| | | 3W | |
| *4 | — | 3L | 13% |
| | | 3W | |
| *5 | 18L | 3L | 48% |
| | | 3W | |
| **6 | — | 2L | 16% |
| | | 1H | |
| | | 6W | |
| **7 | — | — | — |
| **8 | — | 1W | 2% |
| **9 | — | — | — |
| **10 | — | — | — |

*Forty cells in each lot and each cell measured 0.310 inch diameter by 0.140 inch high.
**Fifty cells in each lot and each cell measured 0.455 inch diameter by 0.165 inch high.
***% Total - % leakage (W) and/or Salting (L,H) observed at one or more locations on the cells based on the total number of cells.
L - Light Salting
H - Heavy Salting
W - Cell is Wet
— No Liquid or Salt

What is claimed is:

1. A sealed electrochemical cell comprising a cathode material, an anodic material and an electrolyte housed in a container sealed at its open end by a closure means which comprises a cover and a nonconductive gasket at least partially coated with a polyamide-containing material, said coated gasket being disposed and compressed between the interface of the cover and the container; the improvement being a bead of a polyamide adhesive disposed on the top edge of the gasket and extending over to contact the edge of the container and the edge of the cover.

2. The sealed electrochemical cell of claim 1 wherein the polyamide adhesive is a fatty polyamide having an amine number above 10.

3. The sealed electrochemical cell of claim 1 wherein the gasket is coated with a fatty polyamide-containing material.

4. The sealed electrochemical cell of claim 1, 2 or 3 wherein the gasket material is selected from the group consisting of nylon, polypropylene, ethylene-tetrafluoroethylene copolymer and high density polyethylene.

5. The sealed electrochemical cell of claim 1, 2 or 3 wherein the electrolyte is an aqueous potassium hydroxide or sodium hydroxide solution.

6. The sealed electrochemical cell of claim 1, 2 or 3 wherein the electrolyte is an aqueous potassium hydroxide solution, the gasket is nylon coated with a fatty polyamide-containing material and the polyamide adhesive bead is a fatty polyamide-containing material.

* * * * *